(12) United States Patent
Ladouceur et al.

(10) Patent No.: US 7,869,843 B2
(45) Date of Patent: Jan. 11, 2011

(54) HAND HELD MOBILE COMMUNICATION DEVICE

(75) Inventors: Norman Ladouceur, Waterloo (CA); Jason Griffin, Kitchener (CA); Roman Rak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 25 days.

(21) Appl. No.: 12/204,853

(22) Filed: Sep. 5, 2008

(65) Prior Publication Data

US 2010/0061054 A1    Mar. 11, 2010

(51) Int. Cl.
*H04M 1/00* (2006.01)
*H05K 5/00* (2006.01)
*H05K 7/00* (2006.01)

(52) U.S. Cl. .............. 455/575.3; 455/575.1; 455/575.4; 361/679.21; 361/679.26; 361/679.56

(58) Field of Classification Search ............ 361/679.21, 361/679.26, 679.56; 455/575.1, 575.3, 575.4
See application file for complete search history.

(56) References Cited

U.S. PATENT DOCUMENTS

| | | | |
|---|---|---|---|
| 6,144,358 A * | 11/2000 | Narayanaswamy et al. . | 345/102 |
| 6,149,442 A * | 11/2000 | Enright ......................... | 439/31 |
| 6,226,501 B1 | 5/2001 | Weadon et al. | |
| 6,643,124 B1 | 11/2003 | Wilk | |
| D539,279 S * | 3/2007 | Takeshita et al. ........ | D14/260.1 |
| 7,187,958 B2 * | 3/2007 | Nishijima et al. ......... | 455/575.3 |
| 7,419,099 B2 * | 9/2008 | Lee et al. ................ | 235/472.01 |
| 7,480,379 B2 * | 1/2009 | Yoshikawa ............. | 379/433.06 |
| 2005/0083642 A1 | 4/2005 | Senpuku | |
| 2006/0066581 A1 | 3/2006 | Lyon et al. | |
| 2006/0148544 A1 | 7/2006 | Kim | |
| 2007/0060217 A1* | 3/2007 | Kim ........................ | 455/575.3 |
| 2008/0180398 A1 | 7/2008 | Kim | |

FOREIGN PATENT DOCUMENTS

CA    2512175    1/2006

OTHER PUBLICATIONS

European Search Report dated Jan. 23, 2009.

\* cited by examiner

*Primary Examiner*—Jayprakash N Gandhi
*Assistant Examiner*—Anthony M Haughton
(74) *Attorney, Agent, or Firm*—Perry+Currier Inc.

(57) ABSTRACT

A hand held mobile device capable of executing a software application includes a top body portion; a bottom body portion; a hinge portion connecting the top and bottom body portions and permitting movement of the top and bottom body portions between a closed position and an open position. A first screen is provided on the top body portion and is accessible in the open position, and a second screen is slidable on the bottom body portion to reveal a keyboard when the top and bottom body portions are in the open position and the second screen is in an extended position. Preferably, at least one of the screens functions as a touch screen based on at least one function of the software application and whether the second screen is extended to reveal the keyboard.

13 Claims, 3 Drawing Sheets

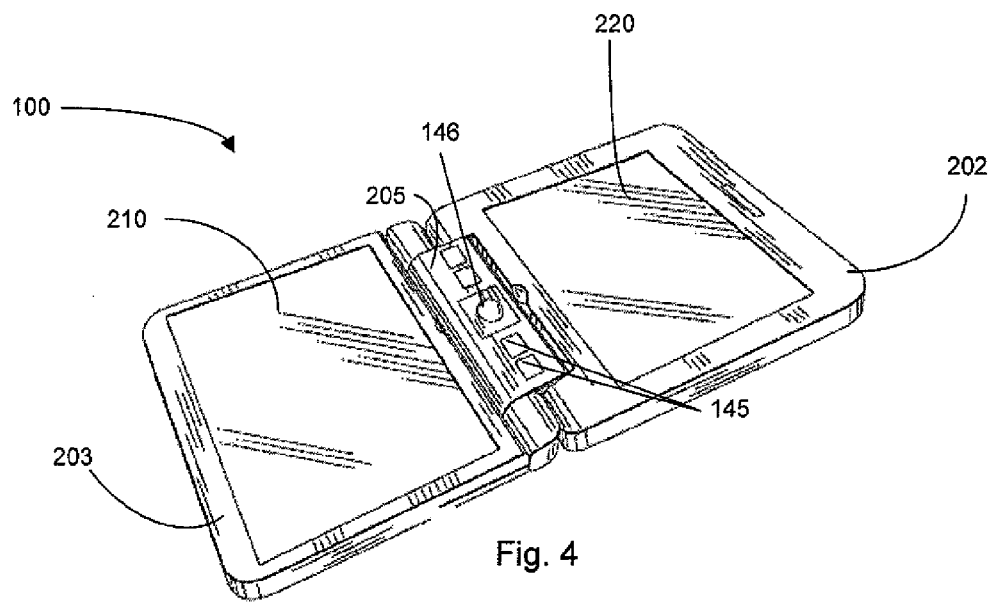
Fig. 4
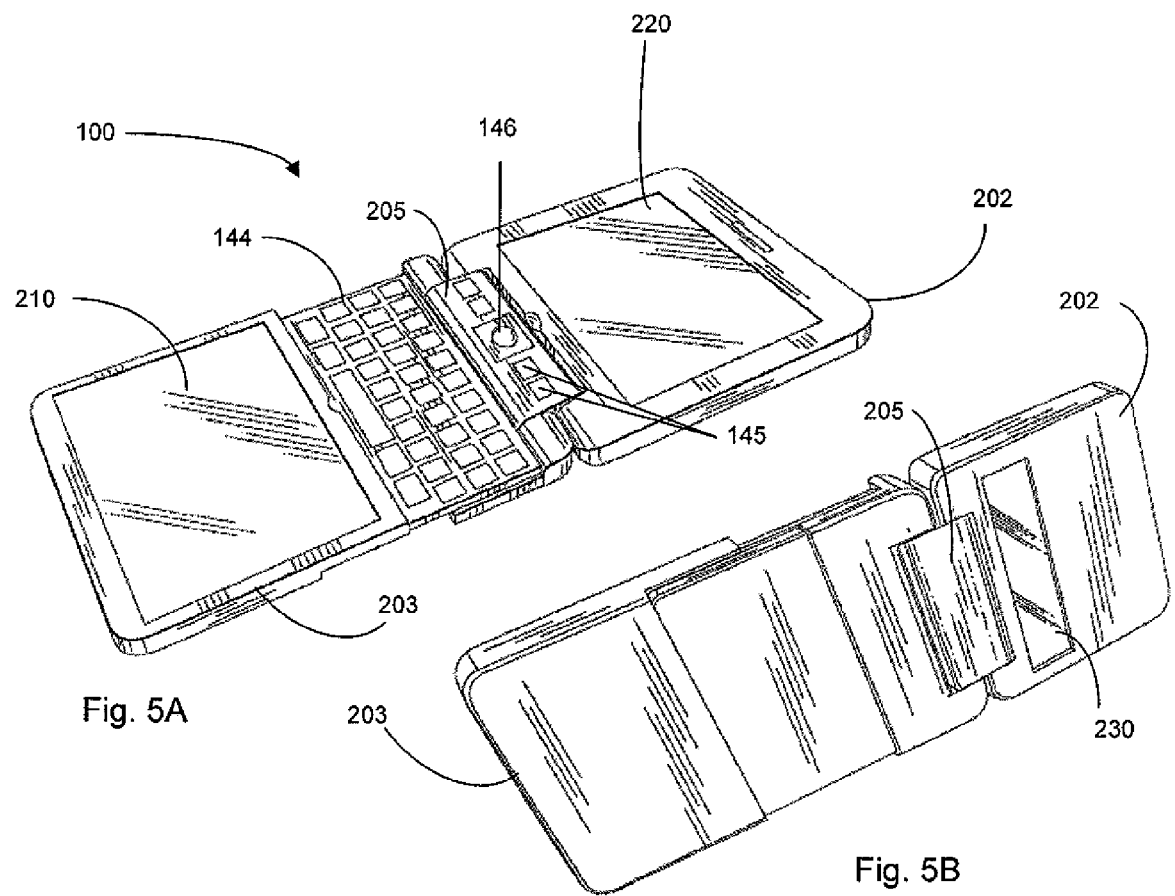
Fig. 5A
Fig. 5B

HAND HELD MOBILE COMMUNICATION DEVICE

FIELD

The present specification relates to mobile devices and in particular to a hand held mobile communication device with multiple display screens and user inputs.

BACKGROUND

Mobile devices are ubiquitous for business and personal use. Handheld mobile devices, sometimes referred to as mobile stations, are essentially portable computers having wireless capability, and come in various forms. These include Personal Digital Assistants (PDAs), cellular phones and smart phones. Reduced size is an advantage to portability, but presents challenges to inputting and display of information. Some known solutions to these challenges include the incorporation of combined text-entry keyboard and telephone keypads on mobile devices such as cellular telephones, wireless personal digital assistants (PDAs), two-way messaging devices and others.

It is also known in the art to provide a primary keypad for a mobile communication device and a movable flip cover that contains a secondary keypad, as disclosed in U.S. Pat. No. 6,226,501 (Weadon et al).

Further, CA 2,512,217 (Fyke et al) discloses a telephone keypad arranged on one side of a mobile communication device for providing an input signal corresponding to at least one telephone character, a keyboard arranged on the opposite side of the device for providing an input signal corresponding to at least one text character, where the telephone keypad is operable when the input device is in the first position, and the keyboard is operable when the input device is in the second position.

Moreover, it is also known in the art to provide mobile communication devices with touch-sensitive input screens, such as disclosed in US Patent Publication No. 2006/0066581 (Lyon et al).

Ergonomic comfort and facilitating fast and accurate text entry for e-mail, messaging, notes and other applications continue to pose challenges to the design of effective interfaces for such mobile devices.

BRIEF DESCRIPTION OF THE DRAWINGS

Exemplary embodiments will be better understood with reference to the following Figures in which like numerals denote like parts and in which:

FIG. 4 is a perspective view of the mobile communication device depicted in FIGS. 2 and 3 in a fully open position; and FIG. 5A is a top perspective view and FIG. 5B is a bottom perspective view of the mobile communication device depicted in FIGS. 2-4, with a portion thereof slid open to reveal a further input device.

DETAILED DESCRIPTION

According to an aspect of this specification, there is set forth: a hand held mobile device capable of executing a software application, comprising: a top body portion; a bottom body portion; a hinge portion connecting said top and bottom body portions and permitting movement of said top and bottom body portions between closed and open positions; a first screen on said top body portion and accessible in said open position; and a second screen slidable on said bottom body portion to reveal a keyboard when said top and bottom body portions are in said open position and said second screen is in an extended position.

Figure 1:
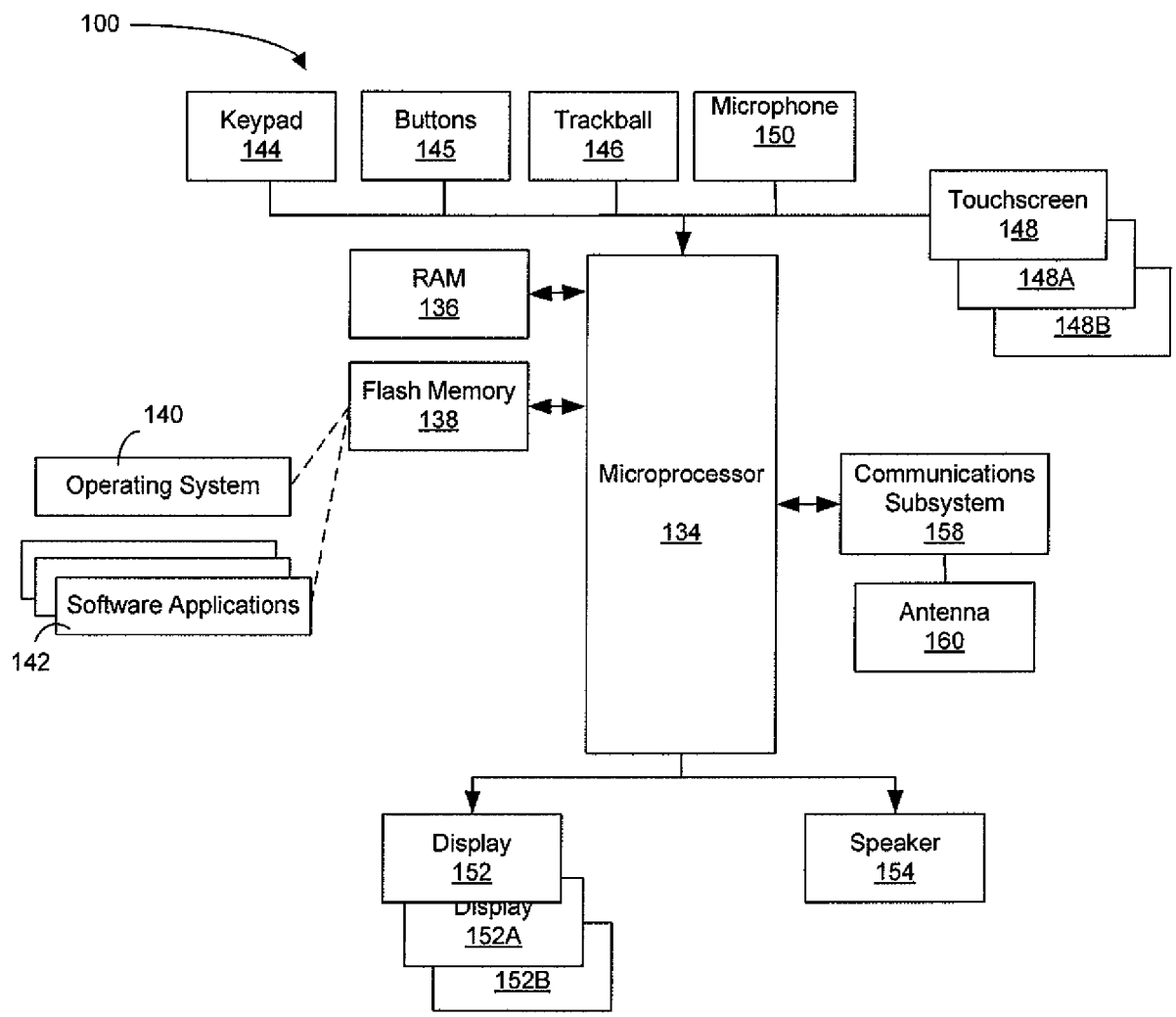
FIG. 1 is a block diagram of components of a mobile communication device according to an exemplary embodiment.

Referring briefly to FIG. 1, a block diagram is provided of certain components, including internal components, within a mobile communication device 100 to which an exemplary interface, such as set forth in FIGS. 2-5, may be applied. The mobile communication device of FIG. 1 includes a microprocessor 134 connected to a random access memory (RAM) 136 and a persistent storage device, which in the illustrated embodiment is a flash memory 138. Flash memory 138 is responsible for various non-volatile storage functions of the mobile communication device 100, such as operating system software 140, executable by the microprocessor 134. It will be appreciated, however, that the operating system software 140 can be stored in other types of memory such as read-only memory (ROM). In the illustrated embodiment, software applications 142 are stored in the persistent storage device 138 for execution by the microprocessor 134 for carrying out various functions, as is known in the art. The microprocessor 134 receives input from various input devices including a keypad or keyboard 144, buttons 145, a trackball 146, at least one touch screen 148, 148A, 148B, etc., and a microphone 150. The microprocessor 134 outputs to various output devices including at least one display 152, 152A, 152B, etc., such as an LCD display and a speaker 154. Other input devices (e.g. SEND and END keys, navigation keys or buttons, etc.) and output devices (e.g. LED message lamps, etc.) may also be provided. In some embodiments, the touch screen 148, 148A, 148B, etc., may be disposed so as to overlay the display 152, 152A, 152B, etc.

The mobile device 100 may send and receive communication signals over the wireless network after required network registration or activation procedures have been completed. Network access is associated with a subscriber or user of the mobile device via a SIM/RUIM card (i.e. Subscriber Identity Module or a Removable User Identity Module) within the communication subsystem 158. The SIM card (not shown) or RUIM is one type of a conventional "smart card" that can be used to identify a subscriber of the mobile device and to personalize the mobile device, among other things.

In a data communication mode, a received signal such as an email message or Web page is processed by the communications subsystem 158 and input to the microprocessor 134 for further processing and output to the displays 152, 152A, 152B, etc. A user of the mobile communication device 100 can also compose data items within a software application such as a messaging application, using the keypad 144 and/or touch screen 148, 148A, 148B, etc., in conjunction with display 152, 152A, 152B, etc. Such composed items can then be transmitted over the communications network through the communications subsystem 158 and antenna 160.

For voice communications, the overall operation of the mobile device 100 is substantially similar, except that the received signals are output to the speaker 154, and signals for transmission are generated by the microphone 150. Alternative voice or audio I/O subsystems, such as a voice message recording subsystem, can also be implemented on the mobile device. Although voice or audio signal output is accomplished primarily through the speaker 154, the display 152, 152A, etc. can also be used to provide additional information such as the identity of a calling party, duration of a voice call, or other voice call related information.

As indicated above, the flash memory 138 stores a plurality of applications 142 executable by the microprocessor 134, such as a message application for allowing a user to send and receive electronic messages (email), an attachment content handling application, which operates in conjunction with the message application to provide the user with attachment content handling options for messages that have an associated attachment. The attachment may be a document converted to plain text, an audio file compressed to WAV or an image file, for example. Once the user selects an attachment document for viewing according to a preferred attachment content handling option, the attachment content handling application generates a request for an attachment server to download the transcoded/compressed attachment, which can thereafter be viewed/played using an attachment viewer application.

In the embodiment of FIG. 1, the mobile device 100 is based on the computing environment and functionality of a wireless personal digital assistant (PDA). It will be understood, however, that the mobile device is not limited to communication devices such as wireless personal digital assistants. Other mobile devices are possible, such as Personal Digital Assistants (with or without communication capabilities), smart telephones, portable entertainment devices, etc.

From the foregoing, it will be apparent that the mobile device 100 performs a wide variety of complex functions and that it is a challenge to provide an interface that is sufficiently compact to match the form factor of the handheld device while providing the necessary level of functionality.

FIGS. 2-5 depict an exemplary embodiment of a mobile communication device 100 as depicted in FIG. 1. Certain components, such as speaker 154, microphone 150, antenna 160, etc., are normally embedded within the device and therefore are not shown. The device 100 is of 'flip' configuration having a top body portion 202 and a bottom body portion 203 connected via a hinge portion 205. From FIG. 5, it will be noted that hinge portion 205 is of double-hinge design. The device 100 incorporates an interface having multiple inputs/outputs selectively available for use based on various open and closed configurations of the device, and software applications 142, as set forth in greater detail below.

When the top body portion 102 of mobile device 100 is opened from a closed position (FIG. 2) to an open position (FIGS. 3-5) a pair of display screens 210 and 220 are revealed, either of which may or may not operate as touch screens. Multiple ranges of open positions may be achieved by providing a detent or stop in the mechanism of hinge portion 205 at predetermined angles of travel (e.g. 90 degrees and 155 degrees partially open, fully open at 180 degrees, etc.). In the context of the electronic functionality discussed with reference to FIG. 1, either of screens 210 or 220 may operate as simple displays 152, 152A, 152B, etc., such as LCD displays, or as touch screen 148, 148A, 148B, etc.

Figure 3:
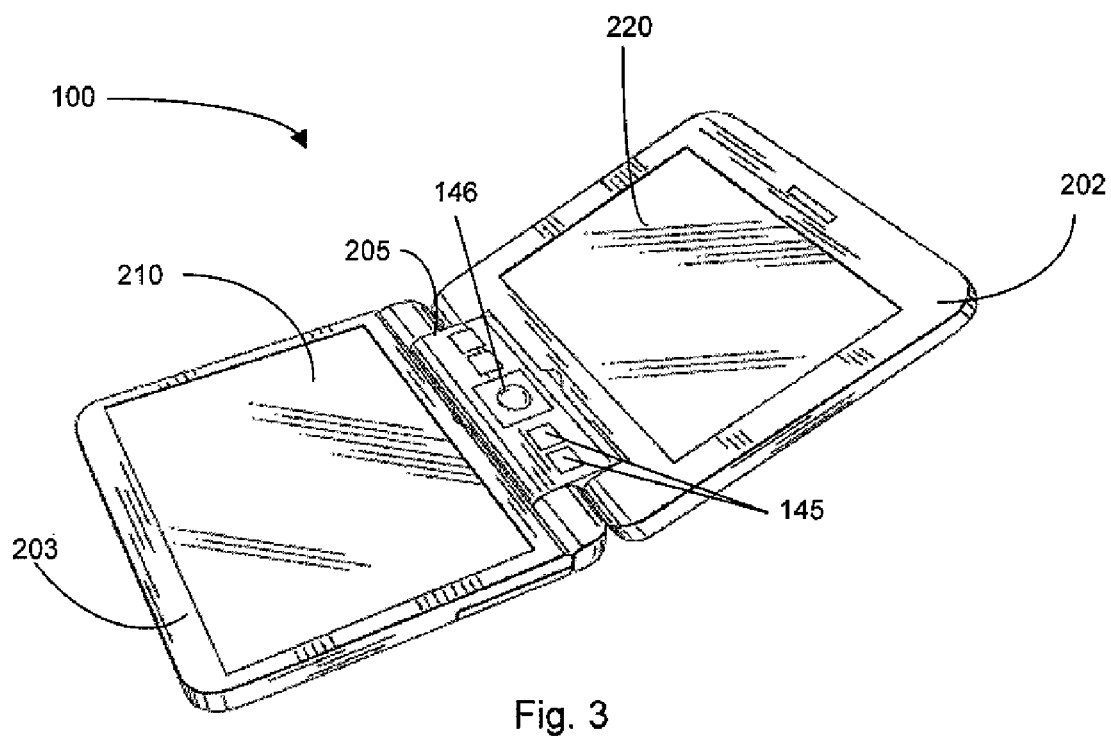
FIG. 3 is a perspective view of the mobile communication device depicted in FIG. 2 in a partially open position, revealing input/output devices thereof.

In FIGS. 3 and 4, when keyboard 144 is hidden, touchscreen 148 can be configured to show a variety of virtual keyboards layouts, such as a QWERTY, DVORAK, AZERTY. Further, other layouts such as a numeric phonepad, Suretype™ may also be supported. The virtual keyboard layouts can be configured based on the application in focus.

In the fully open position (FIGS. 5A and 5B), screen 210 may be caused to slide open, for example via guiding rails, to reveal a keyboard 144. A person of skill in the art will understand that a mechanical stop or other mechanism is also provided to prevent the screen 210 from become disengaged from the mobile device 100. Preferably, keyboard 144 is a standard QWERTY keyboard for providing ergonomic comfort when entering text/numbers for functions such as email, taking notes, Internet access, calendar, to-do list and others. Alternatively, keyboard 144 can be arranged in other conventional patterns, such as a DVORAK style keyboard, an alphabetic style keyboard, a QWERTZ style keyboard, an AZERTY style keyboard, a calculator keyboard, a telephone keypad, or the like.

Both the top body portion 202 and the bottom body portion 203 are attached to the hinge portion 205 using an independent hinge joint (i.e. a double hinge), as discussed above and as shown in FIG. 5B.

The function of screens 210 and 220, when device 100 is in the open position (FIGS. 4 and 5), may depend on whether the screen 210 of bottom body portion 203 has been extended to reveal keyboard 144 and/or on which software application 142 is being executed by the microprocessor 134. In that regard, as discussed above, buttons 145, trackball 146, or other auxiliary input device(s), may be used to navigate the screens 210 and/or 220 such as by launching a menu selection using buttons 145 or moving a cursor to select an application 142 or to perform other menu-based functions.

Thus, when an email application or a word processing application is running, the text being typed on keyboard 144 can be displayed on screen 220 with mis-typed words being highlighted, and screen 210 can operate as a touch screen for listing correct word options (i.e. displayed by a spell check option) for touch selection so as to replace the highlighted word on screen 220. Similarly, screen 210 can operate as a touch screen for listing word options (i.e. displayed by a text disambiguation option) for touch selection so as to replace partially completed words on screen 220.

When an email application or a web browser application are in use, screen 220 can operate as a main display while screen 210 is used to display document or image attachments.

When a mapping or GPS application is running on the device 100, screens 210 and 220 may by configured to display different zoom levels of an area being rendered.

When a phone application is in use screen 210 may operate as a touch screen telephone dial pad while screen 220 shows the number being dialed.

As a further alternative, screen 220 may operate as a secondary display for an additional software application 142 (e.g. calculator, address book, map, etc.), while screen 210 operates as the primary display for a foreground application (e.g. email, calendar, etc.).

A person of skill in the art can appreciate that a variety of sensors, such as induction, opto-mechanical, or electro-mechanical contacts, may be used to determine when the top and bottom portions 202 and 203 are in the closed (FIG. 2) or open positions (FIGS. 3-5) and whether the bottom portion 203 has been extended (FIGS. 5A and 5B) to reveal the keyboard 144.

Figure 2:
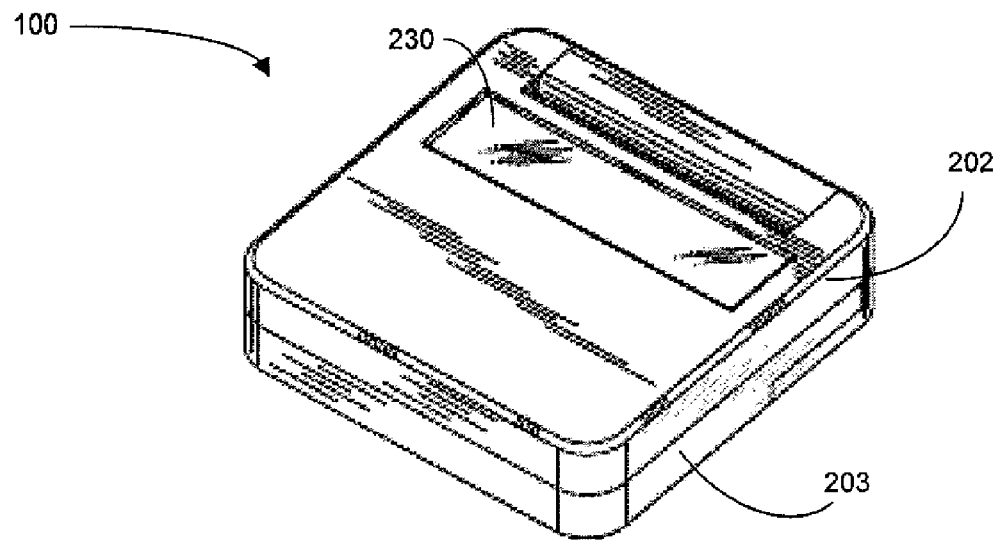
FIG. 2 is a perspective view of a mobile communication device, in a closed position, according to the preferred embodiment.

In the closed position of FIG. 2, a further display screen 230 may be used, for example, to preview information such as caller name or number of an incoming phone call or an email sender name and subject line of a received email message. As shown in FIGS. 2 and 5B, the screen 230 is preferably smaller in size than the screens 210 and 220.

Preferably, the screens 210, 220, 230, and keyboard 144 of the mobile device 100 can be optimally configured by changing the relative disposition of top and bottom body portions 202 and 203 (i.e. closed, open, keyboard extended/retracted) to meet different application needs and to facilitate effective data entry.

Specific embodiments have been shown and described herein. However, modifications and variations may occur to those skilled in the art. For example, as discussed above, although the exemplary embodiment has been described in terms of implementation on a portable handheld electronic device, the principles set forth herein may be applied to other devices such as portable entertainment devices. All such modifications and variations are believed to be within the sphere and scope of the present embodiment.

What is claimed is:

1. A hand held mobile device capable of executing a software application, comprising: a top body portion; a bottom body portion; a hinge portion connecting said top and bottom body portions and permitting movement of said top and bottom body portions between a closed position and an open position; a first screen on said top body portion and accessible in said open position; and a second screen slidable on said bottom body portion, relative to said bottom body portion, to reveal an input device between said first screen and said second screen when said top and bottom body portions are in said open position and said second screen is in an extended position.

2. The device of claim 1, further including a third screen on an opposite side of said top body portion from said first screen for use as a preview screen when said top and bottom body portions are in said closed position.

3. The device of claim 1, wherein at least one of said screens functions as a touch screen based on at least one function of said software application and whether said second screen is extended to reveal said input device.

4. The device of claim 3, wherein said second screen is operable as a touch screen when said software application function includes text entry and said second screen is extended to reveal said input device.

5. The device of claim 3, wherein said first screen is operable to display text and said second screen is operable to display attachments when said software application function includes email viewing functionality.

6. The device of claim 3, wherein said first screen is operable to display map data at a first zoom level and said second screen is operable to display map data at a second zoom level when said software application function includes mapping functionality.

7. The device of claim 3, wherein said second screen is operable as a touch screen telephone dial pad when said software application function includes phone functionality.

8. The device of claim 1, wherein the input device is one of either a QWERTY layout keyboard, a Dvorak layout keyboard, a QWERTZ layout keyboard, an AZERTY layout keyboard, a reduced QWERTY layout keyboard, a calculator layout or a phone keypad layout.

9. The device of claim 1, wherein said device further includes sensor means for sensing said open, closed and extended positions.

10. The device of claim 1, wherein said hinge portion includes at least one auxiliary input device accessible in said open position.

11. The device of claim 10, wherein the auxiliary input device is a trackball.

12. The device of claim 1, wherein said hinge portion includes a detent at predetermined angles between said open and closed positions.

13. The device of claim 1 wherein said first and second screens are touchscreens when said device is in a open position and said second screen is in a contracted position wherein said keyboard is hidden.

* * * * *